UNITED STATES PATENT OFFICE.

DAVID AHL, OF NEWVILLE, PENNSYLVANIA.

IMPROVEMENT IN SURGICAL SPLINTS.

Specification forming part of Letters Patent No. 23,996, dated May 17, 1859.

*To all whom it may concern:*

Be it known that I, DAVID AHL, of Newville, in the county of Cumberland and State of Pennsylvania, have invented a new and Improved Adjustable Fracture Apparatus; and I do hereby declare that the following is a full, clear, and exact description thereof, and of the articles of which it is composed and its mode of preparation.

The nature of my invention consists in saturating felt or any other cloth by certain gums, hereinafter described, and applying the cloth so saturated, after being soaked in diluted mineral or other acids, either to the naked limbs or to a model of the same.

To enable others skilled in the art to make and use my invention, I will proceed to describe its construction and operation.

I use in its composition gum-shellac, gum-copal, and borate of soda, or pearlash. The quantity of each article I generally use is as follows: gum-shellac, two pounds; gum-copal, two ounces; borate of soda, one pound, or in lieu thereof one-fourth pound of pearlash. They are put into a kettle and covered with a sufficient quantity of water and made to boil, the articles to be well mixed until they are perfectly dissolved. I then take a sufficient quantity of felt or other cloth to absorb the same. The felt or any other cloth is then perfectly saturated with the preparation and perfectly dried. It is then entirely immersed in diluted mineral or other acids, and left there for two or more hours, which process fixes or sets the gums, so that it is not acted upon by water to displace the composition, which can be done previous to soaking in acids. The preparation is then immersed in boiling water and molded into the desired form. Boiling water will soften the composition sufficiently long to mold it into any shape desired. In a few minutes it gets hard as very thick binder's board, and remains thus if immersed for any length of time in warm or cold water. It is not affected by the heat of the body; and to make it porous I puncture the preparation with needles.

I wish it to be understood that I do not bind myself to the proportions above mentioned, as they can be varied at pleasure.

The advantages of this preparation in the treatment of fractures are manifold.

First. On account of its being able to be softened by boiling water it is adjustable, and will remain in the shape it is put.

Second. When the swelling consequent on a fracture is reduced it adjusts itself to the reduction.

Third. Extension is kept up by the tuberosities of the bones in the vicinity of joints, and there is less danger of anchylosis.

Fourth. It retains fractured dislocations more permanently in position, obviates the great pain, and is not liable to be disturbed.

Fifth. Elasticity and cheapness, and being equally as well adapted to the fractures of animals as of human beings. After the material is saturated and applied to the limbs or model of wood, I apply a hot iron to the surface to concentrate the gums.

Sixth. It is superior to other apparatuses on account of keeping the fractured parts better in contact, and they are less liable to be disturbed.

I claim—

As a new article of manufacture, my improved splint, made of the ingredients and in the manner set forth.

DAVID AHL.

Witnesses:
 EDM. F. BROWN,
 A. C. KLINK.